E. H. ASHCROFT.
Peat Machine.
No. 54,663.
Patented May 15, 1866.
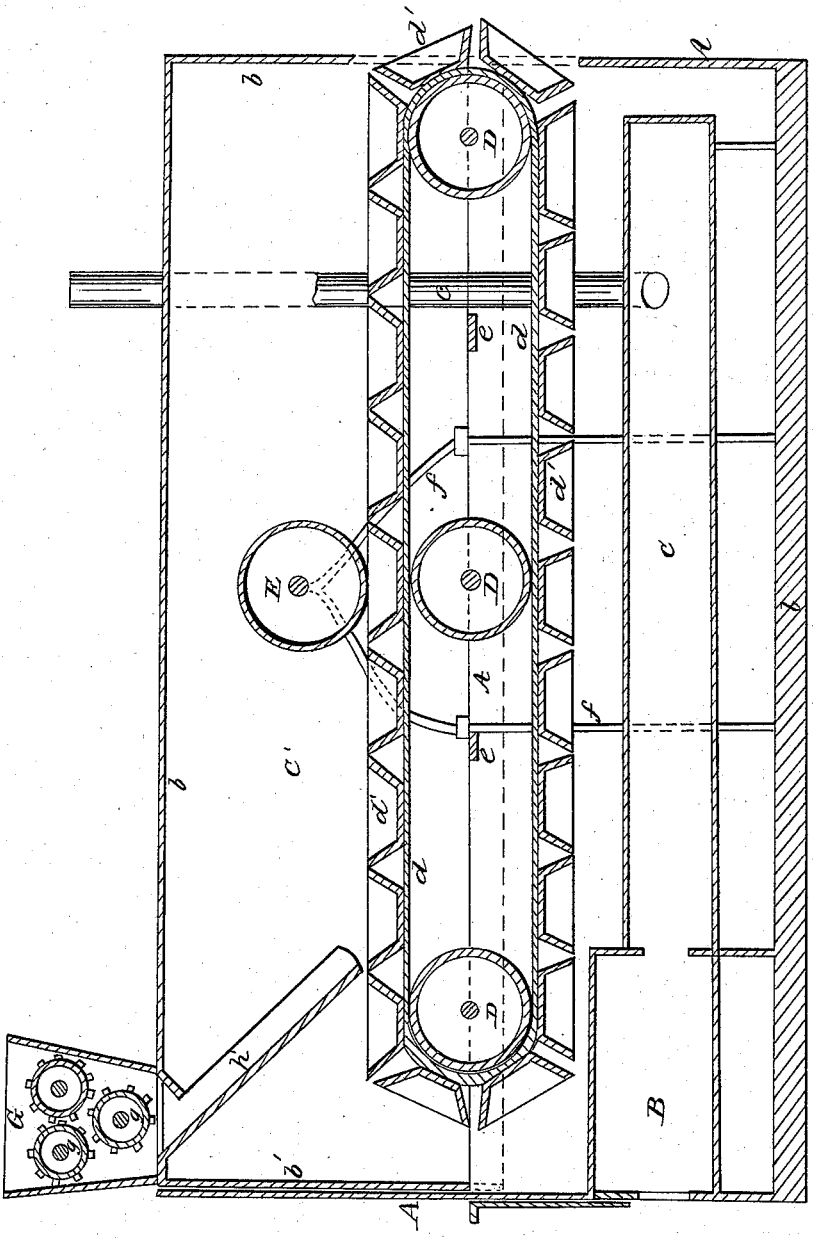
Witnesses:
Inventor:

UNITED STATES PATENT OFFICE.

EDWD. H. ASHCROFT, OF LYNN, MASSACHUSETTS.

IMPROVED APPARATUS FOR MOLDING AND DRYING PEAT.

Specification forming part of Letters Patent No. 54,663, dated May 15, 1866.

*To all whom it may concern:*

Be it known that I, EDWARD H. ASHCROFT, of the city of Lynn, county of Essex, in the State of Massachusetts, have invented a new and Improved Machine for Molding and Drying Peat; and I do hereby declare that the following is a full and exact description thereof, reference being had to the accompanying drawing, and to the letters of reference marked thereon.

The nature of my invention consists in molding peat, (delivered in a certain way with a series of molds in motion on an endless belt,) first passing under a supply hopper and chute, afterward passing under a revolving pressure-roller, and delivered at the other end in a condition to be handled as it passes along in a hot-air chamber.

To enable others skilled in the art to make and use my invention, I will proceed to describe its construction and operation.

The drawing represents a central vertical and longitudinal section of the machine.

A represents the main body or frame of the machine, and b its bottom. b' is a top or semi-cylindrical lid capable of being removed, if desired. In front B represents a furnace with usual grate-bars or their equivalents, and C is a large tube or cylinder running back the length of the machine, with enough surface to give off the required degree of heat to fill the chamber C' and dry or bake the peat in the molds above. The smoke passing through this escapes through a side pipe, c'.

D D D show three supporting-cylinders, around which passes an endless belt or belts, d, to which are attached, in any suitable and secure manner, a series of flaring molds, d'. Several rows of these molds may be put in each machine. The axes of these cylinders have proper bearings or supports on top of frame A. e e are stays or braces securing the tops of the two longitudinal sides of A together.

f is a standard supporting a top or pressure roller, E, under which the molds pass after being filled. This roller presses compactly the peat in the molds, it being intended it should be supplied in such a state as to compact by pressure at same time when the molds reach the rear end, where they turn down and empty, that the cake will be in a condition for handling or dropped upon an endless belt, and further drying can be accomplished the same as with bricks, or in a kiln. Suitable belts and pulleys or other gearing can be applied, so as to give all of these cylinders the requisite motion to perform what they are intended for.

G is a hopper containing several toothed cylinders g. Into this hopper the peat is fed in proper condition, after it has undergone a suitable draining and drying operation or preparation. The toothed cylinders disintegrate the peat and its vegetable fibers, after which it passes down a chute, h, into the molds, as if it had undergone a raking or sifting process very necessary. This, too, secures a uniform supply of material to each mold. Motion is also given to these cylinders in any suitable manner.

This machine can be built of iron of any suitable strength and put on wheels, so as to be moved about at pleasure, or may be stationary and built of brick. As the filled molds pass along to the rear the heated air of the chamber assists in drying, baking, or hardening their contents, and as they pass underneath, going forward, the molds become more or less heated on their insides.

The usual cylinders and rollers can be made of metal or any other suitable material, and a simple device can be arranged at rear end to tap automatically each mold to assist in expelling the peat cake or brick as the mold turns down to empty itself.

Having thus described my invention, what I claim as new, and desire to secure by Letters Patent of the United States, is—

The herein-described mode of preparing peat for fuel—namely, filling the molds, compacting the same, drying and discharging at one operation, in the manner substantially as set forth.

E. H. ASHCROFT.

Witnesses:
S. S. FAHNESTOCK,
THEODORE LANG.